United States Patent
Kumazawa et al.

(10) Patent No.: US 9,332,016 B2
(45) Date of Patent: May 3, 2016

(54) WEB SERVER, INFORMATION PROVIDING METHOD, AND INFORMATION PROVIDING SYSTEM

(71) Applicant: FUJITSU LIMITED, Kawasaki-shi (JP)

(72) Inventors: Takeshi Kumazawa, Yokohama (JP); Kazuo Tomono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 13/726,216

(22) Filed: Dec. 23, 2012

(65) Prior Publication Data

US 2013/0263225 A1 Oct. 3, 2013

(30) Foreign Application Priority Data

Mar. 28, 2012 (JP) ................................. 2012-075192

(51) Int. Cl.
*H04L 29/06* (2006.01)

(52) U.S. Cl.
CPC .............. *H04L 63/10* (2013.01); *H04L 63/102* (2013.01)

(58) Field of Classification Search
CPC ..... H04L 63/10; H04L 63/101; H04L 63/104; H04L 63/102
USPC .......................................................... 726/4
See application file for complete search history.

(56) References Cited

U.S. PATENT DOCUMENTS

| | | | |
|---|---|---|---|
| 6,697,824 B1 * | 2/2004 | Bowman-Amuah | 709/229 |
| 7,467,100 B2 * | 12/2008 | Matsumori | G06Q 30/02 705/26.8 |
| 7,979,353 B2 * | 7/2011 | Akama | G06Q 20/10 705/15 |
| 8,775,245 B2 * | 7/2014 | Christie | G06F 21/335 705/14.26 |
| 2002/0065713 A1 * | 5/2002 | Awada et al. | 705/14 |
| 2002/0111907 A1 * | 8/2002 | Ling | 705/41 |
| 2002/0156879 A1 * | 10/2002 | Delany et al. | 709/223 |
| 2003/0004802 A1 * | 1/2003 | Callegari | 705/14 |

(Continued)

FOREIGN PATENT DOCUMENTS

| | | |
|---|---|---|
| CN | 101359389 | 2/2009 |
| JP | 2004-030509 | 1/2004 |

(Continued)

OTHER PUBLICATIONS

KROA—Notice of Preliminary Rejection, Office Action of Korean Patent Application No. 10-2012-153218 dated Jul. 9, 2014, with English language translation.

(Continued)

*Primary Examiner* — Hadi Armouche
*Assistant Examiner* — Shahriar Zarrineh
(74) *Attorney, Agent, or Firm* — Fujitsu Patent Center

(57) ABSTRACT

A server device includes a memory and a processor coupled to the memory. The processor executes generating a list in which a privilege of which the number of accesses in a specified time period is larger than a predetermined reference value is associated with an attribute of a member who accessed the privilege more times than the predetermined reference value by reference to the memory. The processor executes estimating, when the server device has accepted access to a membership site from a user, an attribute of the user from a time of the access to the membership site or a site that the user accessed before the access to the membership site. The processor executes extracting a privilege associated with the attribute, and notifying the user of the extracted privilege.

4 Claims, 12 Drawing Sheets

(56) References Cited

U.S. PATENT DOCUMENTS

| | | | |
|---|---|---|---|
| 2004/0225716 A1* | 11/2004 | Shamir et al. | 709/204 |
| 2006/0199533 A1* | 9/2006 | Zilliacus | G06Q 30/02 455/41.2 |
| 2007/0203791 A1* | 8/2007 | Kohl et al. | 705/14 |
| 2008/0052203 A1* | 2/2008 | Beyer et al. | 705/28 |
| 2008/0183571 A1* | 7/2008 | Aaron | 705/14 |
| 2008/0201761 A1* | 8/2008 | Irani et al. | 726/1 |
| 2009/0037266 A1* | 2/2009 | Weiss | G06Q 30/02 705/14.36 |
| 2009/0077670 A1* | 3/2009 | Schireson | 726/27 |
| 2009/0156216 A1* | 6/2009 | Liu | H04H 60/11 455/438 |
| 2009/0216610 A1* | 8/2009 | Chorny | 705/10 |
| 2011/0106635 A1* | 5/2011 | Khan et al. | 705/14.73 |
| 2011/0251880 A1* | 10/2011 | Butler et al. | 705/14.13 |
| 2012/0197700 A1* | 8/2012 | Kalin | 705/14.23 |
| 2013/0024881 A1* | 1/2013 | Liu | 725/23 |
| 2014/0316879 A1* | 10/2014 | Lee | G06Q 20/3278 705/14.38 |
| 2014/0372199 A1* | 12/2014 | Konno | G06Q 30/02 705/14.38 |
| 2015/0051963 A1* | 2/2015 | Matsuda | 705/14.23 |

FOREIGN PATENT DOCUMENTS

| | | |
|---|---|---|
| JP | 2006-520939 | 9/2006 |
| JP | 2011-65217 | 3/2011 |
| KR | 10-2007-0004153 | 1/2007 |
| KR | 10-1073615 | 10/2011 |
| WO | WO-2004/084109 | 9/2004 |

OTHER PUBLICATIONS

KROA—Korean Office Action (Notice of Final Rejection) issued for Korean Patent Application No. 10-2012-153218, mailed on Jan. 26, 2015.

CNOA—Chinese Office Action issued for Chinese Patent Application No. 201210593525.1, dated Oct. 8, 2015.

\* cited by examiner

FIG.1

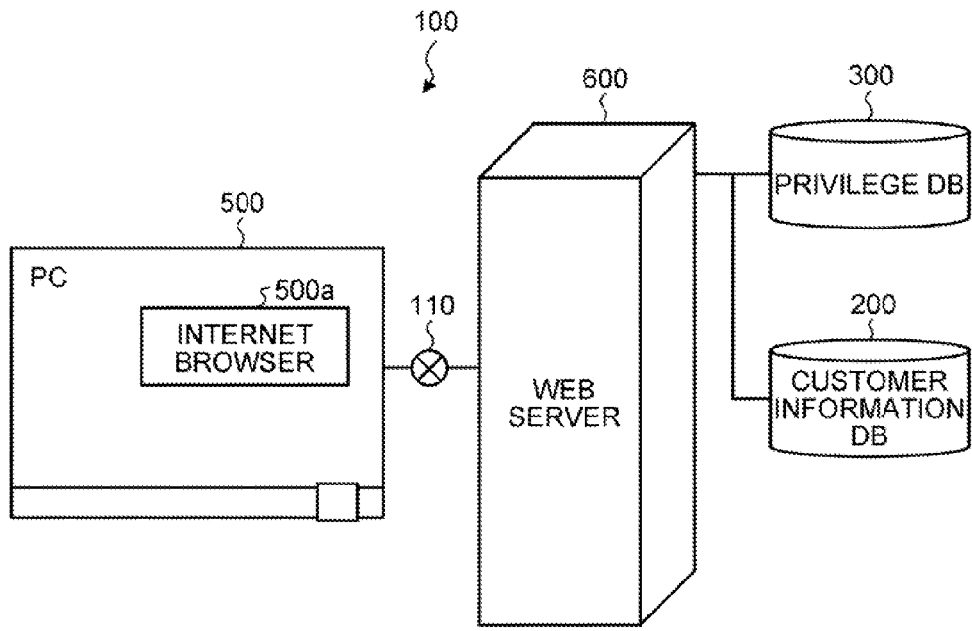

FIG.2

| 1 | MEMBER ID | xxx1 |
|---|---|---|
| 2 | NAME | XXX, YYY |
| 3 | ADDRESS | X PREFECTURE, Y CITY |
| 4 | PHONE NUMBER | 03-xxxx-xxxx |
| 5 | MODEL/TYPE NAME (S) OF UNIT (S) OWNED | a123456789 |
| 6 | MODEL/SERIAL NUMBER (S) OF UNIT (S) OWNED | aaabbbccc |
| 7 | AGE RANGE | 40's |
| 8 | SEX | MALE |
| 9 | OCCUPATION | COMPANY EMPLOYEE |
| 10 | BANK ACCOUNT NUMBER | 0abcdef |
| 11 | CREDIT CARD NUMBER | abcd-xxxx-xxxx-xxxx |
| 12 | MODEL/TYPE NAME OF CURRENTLY-RUNNING UNIT | a123456789 |
| 13 | MODEL/SERIAL NUMBER OF CURRENTLY-RUNNING UNIT | aaabbbccc |

FIG.3

| 1 | PRIVILEGE ID | 00001 |
|---|---|---|
| 2 | PRIVILEGE PROVIDING COMPANY NAME | aaa CO., LTD. |
| 3 | SITE NAME | aaa STORE |
| 4 | SITE URL | http://aaaa.bbbb.ccc.co.jp/index.html |
| 5 | PRIVILEGE EXPIRATION DATE | 2012/12/31 |

FIG.4

| MEMBER ID | ACCESS DATE AND TIME | PRIVILEGE ID | ATTRIBUTE |
|---|---|---|---|
| xxx1 | 2012/01/25/21/33 | 00001 | MALE IN 10's |
| xx15 | 2012/01/25/21/34 | 00134 | MALE IN 10's |
| xx50 | 2012/01/25/21/34 | 00001 | FEMALE IN 20's |

FIG.5

| MEMBER ID | PRIVILEGE ID | USAGE COUNT |
|---|---|---|
| xxx1 | 00001 | 2 |
| xx50 | 00001 | 6 |

| PRIVILEGE ID | USAGE COUNT | PRIVILEGE CONTENT |
|---|---|---|
| 00001 | 0 | - |
| 00001 | 1 TO 5 | 5% DISCOUNT |
| 00001 | 6 OR MORE | 10% DISCOUNT |

| MEMBER ID | ACCESS DATE AND TIME (yyyy/mm/dd/hh/mm) | SITE URL |
|---|---|---|
| xxx1 | 2012/01/25/21/33 | http://xxx.yyy.zzz.co.jp |
| xxx1 | 2012/01/25/22/08 | http://aaaa.bbbb.ccc.co.jp/index.html |

FIG.10

| LIST ID | PRIVILEGE ID | ATTRIBUTE |
|---|---|---|
| 1 | 00001 | MALE IN 10's, FEMALE IN 20's |
| 2 | 00134 | MALE IN 10's |
| 3 | 00365 | FEMALE IN 20's |
| ... | ... | ... |
| 8 | 00071 | FEMALE IN 40's, FEMALE IN 50's |
| 9 | 00051 | MALE IN 40's |
| 10 | 01110 | FEMALE IN 30's |

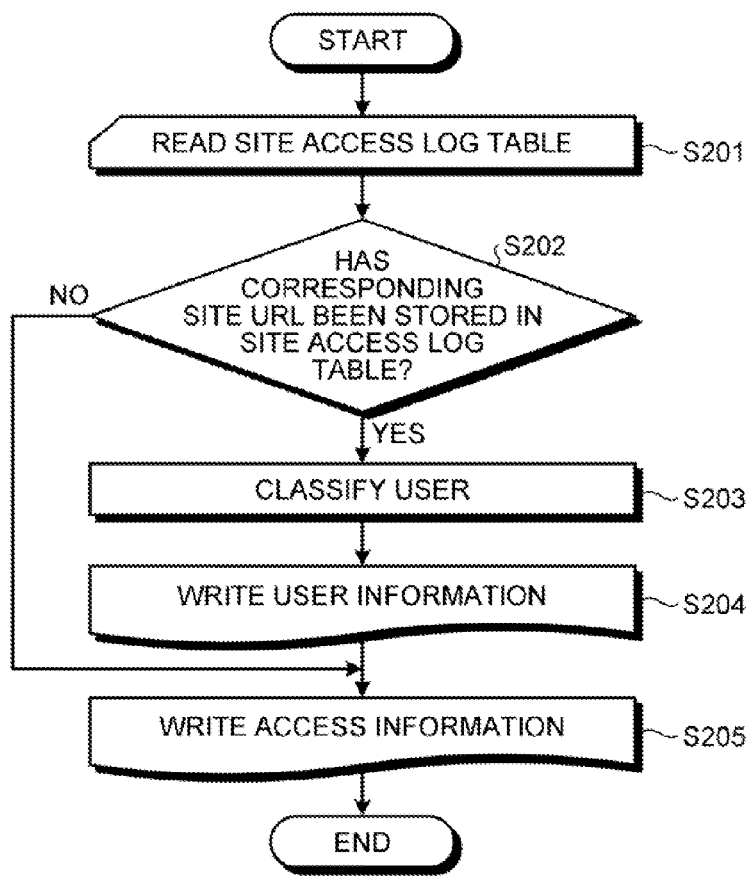

WEB SERVER, INFORMATION PROVIDING METHOD, AND INFORMATION PROVIDING SYSTEM

CROSS-REFERENCE TO RELATED APPLICATIONS

This application is based upon and claims the benefit of priority of the prior Japanese Patent Application No. 2012-075192, filed on Mar. 28, 2012, the entire contents of which are incorporated herein by reference.

FIELD

The embodiments discussed herein are related to a server device, an information providing method, and an information providing system.

BACKGROUND

Conventionally, there is an information providing technique called recommend. The recommend is to introduce a product and a privilege which are highly relevant to a product that a user is currently browsing or a previously-used product. For example, when a user has accessed a shopping site and is browsing a product on the shopping site, the user is introduced to information such as "customers who bought this product also bought the following products".

Furthermore, as another example of the recommend, a membership site tying up with a shopping mall site is explained. When a user registered with this membership site has accessed the membership site, the user is introduced to a privilege on the basis of personal information of the user, such as the user's age and sex registered on the membership site. For example, when a user, who has registered "male in 30's" as his personal information, has accessed the membership site, the user is introduced to a privilege frequently accessed by males in their thirties in a specified time period out of privileges that the membership site provides.

Patent document 1: Japanese Laid-open Patent Publication No. 2011-065217

Patent document 2: Japanese National Publication of International Patent Application No. 2006-520939

However, the above-described related technology has a problem that accuracy of the recommend is not able to be improved.

Specifically, when one PC (Personal Computer) is shared by multiple users, a user different from a user registered with the membership site can access the membership site. For example, when a PC is shared by a father and a mother, and their son at home, the other two other than the father who has registered with the membership site, i.e., the mother and the son can access the membership site. In such a case, for example, when the mother or the son has accessed the membership site, a privilege according to personal information that the father has registered is provided.

Furthermore, a user who has registered with the membership site but has not registered his/her personal information may access the membership site. In this case, the user, who has not registered his/her personal information, is introduced to a frequently-accessed privilege out of privileges that the membership site provides. For example, when a privilege has been frequently accessed by teenage females in a specified time period, the user, who has not registered his/her personal information, is introduced to the privilege frequently accessed by teenage females even if the user is a male in his thirties.

SUMMARY

According to an aspect of an embodiment, a server device includes a memory and a processor coupled to the memory. The processor executes generating a list in which a privilege of which the number of accesses in a specified time period is larger than a predetermined reference value is associated with an attribute of a member who accessed the privilege more times than the predetermined reference value by reference to the memory that stores therein a privilege accessed by a member registered with a membership site, date and time when the member accessed the privilege, and an attribute of the member in an associated manner. The processor executes estimating, when the server device has accepted access to the membership site from a user, an attribute of the user from a time of the access to the membership site or a site that the user accessed before the access to the membership site. The processor executes extracting a privilege associated with the attribute estimated at the estimating from the list generated by the generating, and notifying the user of the extracted privilege.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating a configuration of an information providing system according to a first embodiment;

FIG. 2 is a diagram illustrating an example of information stored in a customer information DB;

FIG. 3 is a diagram illustrating an example of information stored in a registration privilege information table;

FIG. 4 is a diagram illustrating an example of information stored in a privilege access log table;

FIG. 5 is a diagram illustrating an example of information stored in a privilege usage count table;

FIG. 10 is a diagram illustrating an example of a privilege list generated by a privilege-list generating unit;

FIG. 14 is a diagram illustrating an example of information stored in a site access log table according to the second embodiment;

FIG. 15 is a flowchart illustrating a processing procedure of an access-log generating process performed by a PC;

DESCRIPTION OF EMBODIMENTS

Figures 6, 7:
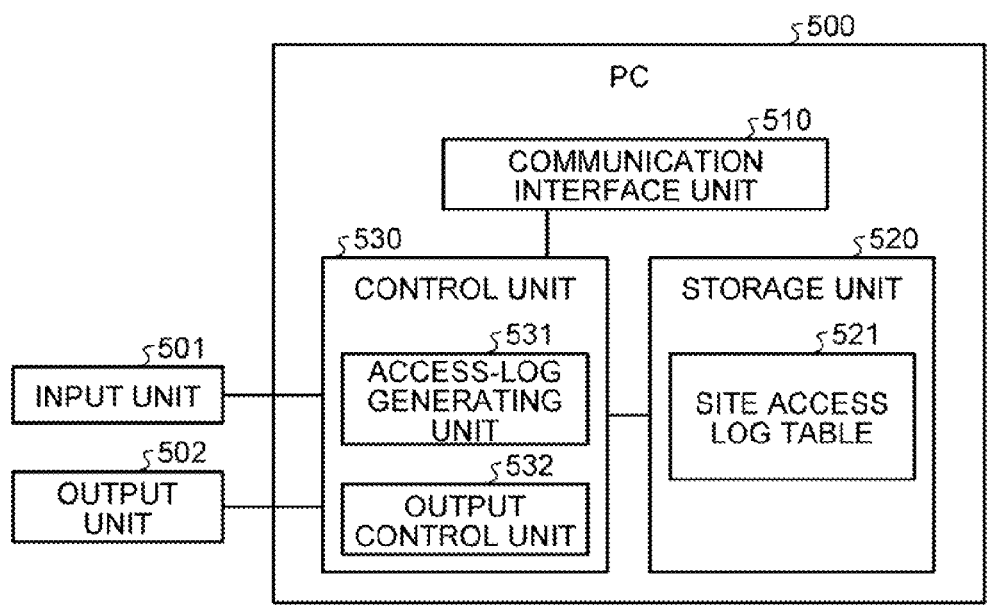
FIG. 6 is a diagram illustrating an example of information stored in an introduced-privilege content table.
FIG. 7 is a block diagram illustrating a functional configuration of a PC according to the first embodiment.

Preferred embodiments of the present invention will be explained with reference to accompanying drawings. Incidentally, the present invention is not limited to the embodiments. Furthermore, the embodiments can be arbitrarily combined within a scope which does not cause a conflict of processing contents.

[a] First Embodiment

In a first embodiment, a web server is taken as an example of a server device. This web server provides, for example, a membership site tying up with a shopping mall site. A member registered with this membership site can directly access the shopping mall site without accessing through the membership site; however, if a member accesses the shopping mall site through the membership site, the member is introduced to a privilege earned by the use of the shopping mall site. Incidentally, in the first embodiment, there is described an information providing system including the web server and a PC that acquires a variety of information by connecting to the web server.

Configuration of Information Providing System

FIG. 1 is a block diagram illustrating a configuration of an information providing system 100 according to the first embodiment. As illustrated in FIG. 1, the information providing system 100 includes a customer information database (DB) 200, a privilege DB 300, a personal computer (PC) 500, and a web server 600.

As illustrated in FIG. 1, the PC 500 and the web server 600 are connected via a network 110 so as to communicate with each other. Furthermore, the web server 600 is connected to the customer information DB 200 and the privilege DB 300. Moreover, the PC 500 and the web server 600 are connected to other servers, etc. (not illustrated) via networks. Incidentally, the other servers include a server for providing the shopping mall site tying up with the membership site. Furthermore, the number of PCs included in the information providing system 100 is not limited to one illustrated in FIG. 1, and can be changed.

The customer information DB 200 stores therein a variety of information on registrants of the membership site. Incidentally, the information stored in the customer information DB 200 will be described later with reference to FIG. 2. The privilege DB 300 stores therein information on privileges that the membership site provides to the registrants. Incidentally, the information stored in the privilege DB 300 will be described later with reference to FIGS. 3 to 6.

The PC 500 is an information processing apparatus that accepts an operation made by a user and requests the web server 600 or another server to provide a variety of information. For example, the PC 500 activates an Internet browser 500a, and accepts an operation made by a user and requests the web server 600 or another server to provide a variety of information. Incidentally, in the explanation described below, the user of the PC 500 shall be a member of the membership site. Furthermore, members of the membership site include some who have acquired a member identifier (ID) and have registered personal information in the membership site and some who have acquired a member ID but have not registered personal information in the membership site.

The web server 600 is a server for providing the membership site. When the web server 600 has accepted access from the PC 500 to the membership site, the web server 600 provides a variety of information. Furthermore, the web server 600 generates a privilege list with reference to the privilege DB 300 that stores therein a privilege to be provided to a member registered with the membership site when having accessed through the membership site, date and time when the member accessed the privilege, and an attribute of the member in an associated manner. For example, the web server 600 generates a list in which a privilege of which the number of accesses in a specified time period is larger than a predetermined reference value is associated with an attribute of a member who accessed the privilege more times than the predetermined reference value. And, when the web server 600 has accepted access to the membership site from a user, the web server 600 estimates an attribute of the user from a time of the access to the membership site or a site that the user accessed before the access to the membership site. Then, the web server 600 extracts a privilege associated with the estimated attribute from the generated list and notifies the user of the privilege.

As an example, the web server 600 introduces a privilege, such as "a shopping mall site A is offering a 3% discount on a product B", selected from the privileges stored in the privilege DB 300 to a user. Incidentally, like the shopping mall site A, a site introducing a privilege to a user by the user accessing the site through the web server 600 is referred to as a "privilege site".

Customer Information DB 200

Subsequently, information stored in the customer information DB 200 is explained with reference to FIG. 2. The customer information DB 200 stores therein registration information including an attribute of the user of the PC 500 who is a registrant of the membership site. Incidentally, hereinafter, the user of the PC 500 is referred to simply as the user.

FIG. 2 is a diagram illustrating an example of information stored in the customer information DB 200. Incidentally, FIG. 2 depicts the customer information DB 200 storing therein information on a user identified by a member ID "xxx1". FIG. 2 illustrates just an example of registration information of the user identified by the member ID "xxx1", and registration information of other registered members can also be stored in the customer information DB 200.

As illustrated in FIG. 2, the customer information DB 200 includes "member ID", "name", "address", "phone number", "model/type name(s) of unit(s) owned", "model/serial number(s) of unit(s) owned", "age range", "sex", "occupation", "bank account number", "credit card number", "model/type name of currently-running unit", and "model/serial number of currently-running unit".

The "member ID" included in the customer information DB 200 stores therein an identifier of a user.

For example, "xxx1" is stored in the "member ID". The "name" included in the customer information DB 200 stores therein a name of the user. For example, "XXX (family name), YYY (given name)" is stored in the "name".

The "address" included in the customer information DB 200 stores user's place of residence. For example, "X prefecture, Y city, . . . " is stored in the "address". The "phone number" included in the customer information DB 200 stores therein a phone number of the user. For example, "03-xxxx-xxxx" is stored in the "phone number".

The "model/type name(s) of unit(s) owned" included in the customer information DB 200 stores model/type name(s) of PC(s) that the user owns. For example, "a123456789" is stored in the "model/type name(s) of unit(s) owned". The "model/serial number(s) of unit(s) owned" included in the customer information DB 200 stores identifier(s) of PC(s) that the user owns. For example, "aaabbbccc" is stored in the "model/serial number(s) of unit(s) owned".

The "age range" included in the customer information DB 200 stores therein an age range of the user. For example, "40's" indicating that the user is at age forty-something is stored in the "age range". The "sex" included in the customer information DB 200 stores sex of the user. For example, "male" or "female" is stored in the "sex".

The "occupation" included in the customer information DB 200 stores user's occupation. For example, "company employee" indicating that the user works for a company is stored in the "occupation". The "bank account number" included in the customer information DB 200 stores therein an account number of a bank specified by the user. For example, "0abcdef" is stored in the "bank account number". The "credit card number" included in the customer information DB 200 stores therein a credit card number of a credit card that the user holds. For example, "abcd-xxxx-xxxx-xxxx" is stored in the "credit card number".

The "model/type name of currently-running unit" included in the customer information DB 200 stores therein a model/type name of a PC that the user is currently running. For example, "a123456789" is stored in the "model/type name of currently-running unit". Incidentally, in FIG. 2, it is indicated that a PC that the user is currently running is the same model/type as the one registered in the "model/type name(s) of unit(s) owned". The "model/serial number of currently-running unit" included in the customer information DB 200 stores therein an identifier of a PC that the user is currently running. For example, "aaabbbccc" is stored in the "model/serial number of currently-running unit". Incidentally, in FIG. 2, it is indicated that a PC that the user is currently running is the same model as the one registered in the "model/serial number(s) of unit(s) owned".

Incidentally, information stored in the customer information DB 200 is not limited to those illustrated in FIG. 2. For example, the customer information DB 200 can be configured to further include "working place" and "marital status", etc. Furthermore, the customer information DB 200 can be configured to include only some of the information illustrated in FIG. 2, for example, "member ID", "name", "address", "phone number", "model/type name(s) of unit(s) owned", "model/serial number(s) of unit(s) owned", "age range", "sex", "bank account number", and "credit card number" only.

Privilege DB 300

Subsequently, information stored in the privilege DB 300 is explained with reference to FIGS. 3 to 6. The privilege DB 300 includes a registration privilege information table 301, a privilege access log table 302, a privilege usage count table 303, and an introduced-privilege content table 304 as tables storing therein a privilege to be introduced by the use of a site through the membership site, a member who accessed a privilege and the access date and time, a privilege usage count, and content of a privilege, respectively.

Registration Privilege Information Table 301

Information stored in the registration privilege information table 301 is explained with reference to FIG. 3. FIG. 3 is a diagram illustrating an example of information stored in the registration privilege information table 301. Incidentally, FIG. 3 depicts the registration privilege information table 301 storing therein information on a privilege identified by a privilege ID "00001". FIG. 3 illustrates the privilege identified by the privilege ID "00001" as an example, and information on other privileges with different privilege IDs can also be stored in the registration privilege information table 301.

As illustrated in FIG. 3, the registration privilege information table 301 stores therein a privilege to be introduced by the use of a site through the membership site. For example, the registration privilege information table 301 includes "privilege ID", "privilege providing company name", "site name", "site URL", and "privilege expiration date".

The "privilege ID" included in the registration privilege information table 301 stores therein an identifier of a privilege to be provided to a user. For example, "00001" is stored in the "privilege ID". The "privilege providing company name" included in the registration privilege information table 301 stores therein a name of a company that provides the privilege. For example, "aaa Co., Ltd." is stored in the "privilege providing company name".

The "site name" included in the registration privilege information table 301 stores therein a name of a site run by the privilege providing company. For example, "aaa store" is stored in the "site name". The "site URL" included in the registration privilege information table 301 stores therein an original URL of the site which is a source of the privilege provided. In other words, the site URL" stores therein a site URL of a privilege site. For example, "http://aaaa.bbbb.ccc.co.jp/index.html" is stored in the site URL". The "privilege expiration date" included in the registration privilege information table 301 stores therein an expiration date of the privilege. For example, "2012/12/31" indicating that the privilege is valid until Dec. 31, 2012 is stored in the "privilege expiration date".

As an example, the registration privilege information table 301 illustrated in FIG. 3 indicates that a site URL of "aaa store" run by "aaa Co., Ltd." is "http://aaaa.bbbb.ccc.co.jp/index.html", and the "aaa store" site provides a privilege "00001" which is valid until Dec. 31, 2012.

Privilege Access Log Table 302

Information stored in the privilege access log table 302 is explained with reference to FIG. 4. FIG. 4 is a diagram illustrating an example of information stored in the privilege access log table 302.

As illustrated in FIG. 4, the privilege access log table 302 stores therein a privilege that a user accessed and the access date and time in an associated manner. For example, the privilege access log table 302 includes "member ID", "access date and time", "privilege ID", and "attribute". The "member ID" included in the privilege access log table 302 is identical to the "member ID" included in the customer information DB 200.

The "access date and time" included in the privilege access log table 302 stores date and time when a user accessed a privilege or a site. For example, "2012/01/25/21/33" indicating that the user accessed the privilege or site at 21:33 on Jan. 25, 2012 is stored in the "access date and time".

The "privilege ID" included in the privilege access log table 302 stores therein an identifier of a privilege that a user accessed. For example, "00001" is stored in the "privilege ID". The "attribute" included in the privilege access log table 302 stores therein an attribute of a member identified from personal information registered by the member. For example, "male in 10's" or "female in 20's" is stored in the "attribute" as information on the member's sex and age. Incidentally, information on "place of residence" and "marital status" can be stored in the "attribute" in addition to information on the member's sex and age.

As an example, the privilege access log table 302 illustrated in FIG. 4 indicates that a user "xxxx1", who is a teenage male, accessed a privilege "00001" at 21:33 on Jan. 25, 2012.

Privilege Usage Count Table 303

Information stored in the privilege usage count table 303 is explained with reference to FIG. 5. FIG. 5 is a diagram illustrating an example of information stored in the privilege usage count table 303.

As illustrated in FIG. 5, the privilege usage count table 303 stores therein a privilege that a user used and a usage count in an associated manner. For example, the privilege usage count table 303 includes "member ID", "privilege ID", and "usage count". The "member ID" included in the privilege usage count table 303 is identical to the "member ID" included in the customer information DB 200. The "privilege ID" included in the privilege usage count table 303 is identical to the "privilege ID" included in the registration privilege information table 301.

The "usage count" included in the privilege usage count table 303 stores therein a usage count of a privilege. For example, "2" indicating that a user has used a privilege twice in the past is stored in the "usage count". Incidentally, the usage count is, for example, the number of times a member accessed a shopping site that the member is introduced to a privilege and purchased a product subject to the privilege, and is not just the number of times the member accessed the shopping site. As an example, the privilege usage count table 303 illustrated in FIG. 5 indicates that a user "xxxx1" has used a privilege "00001" twice in the past.

Introduced-privilege Content Table 304

Information stored in the introduced-privilege content table 304 is explained with reference to FIG. 6. FIG. 6 is a diagram illustrating an example of information stored in the introduced-privilege content table 304. As illustrated in FIG. 6, the introduced-privilege content table 304 includes "privilege ID", "usage count", and "privilege content". The "privilege ID" included in the introduced-privilege content table 304 is identical to the "privilege ID" included in the registration privilege information table 301. The "usage count" included in the introduced-privilege content table 304 stores the number of times a privilege has been used in the past. For example, "0" indicating that the privilege has not been used, "1 to 5" indicating that the privilege has been used at least once but not more than five times, or "6 or more" indicating that the privilege has been used six or more times is stored in the "usage count".

The "privilege content" included in the introduced-privilege content table 304 stores therein a privilege to be introduced to a user when the user has accessed a site through the membership site. For example, "5% discount" is stored in the "privilege content". Incidentally, different contents depending on the number of times the privilege has been used are stored in the "privilege content".

As an example, the introduced-privilege content table 304 illustrated in FIG. 6 indicates that no privilege is introduced when a privilege "00001" has not been used by a user. Furthermore, the introduced-privilege content table 304 illustrated in FIG. 6 indicates that "5% discount" is introduced when the privilege "00001" has been used at least once but not more than five times by the user. Moreover, the introduced-privilege content table 304 illustrated in FIG. 6 indicates that "10% discount" is introduced when the privilege "00001" has been used six or more times by the user.

Incidentally, it is described that the introduced-privilege content table 304 stores different privilege contents depending on the usage count; however, it is not limited to this. For example, the introduced-privilege content table 304 can store predetermined privilege content independent of the usage count. Furthermore, the introduced-privilege content table 304 can store different privilege contents depending on whether a member has registered his/her personal information or not.

Configuration of PC

Subsequently, a functional configuration of the PC 500 according to the first embodiment is explained with reference to FIG. 7. FIG. 7 is a block diagram illustrating the functional configuration of the PC 500 according to the first embodiment. As illustrated in FIG. 7, the PC 500 according to the first embodiment includes an input unit 501, an output unit 502, a communication interface unit 510, a storage unit 520, and a control unit 530.

The input unit 501 is, for example, a keyboard or a touch panel, etc., and accepts various input operations from a user. The output unit 502 is, for example, a monitor or a speaker, and outputs a variety of information to the user. The communication interface unit 510 is connected to the web server 600 via a network, and controls the exchange of information between the PC 500 and the web server 600.

The storage unit 520 is a semiconductor memory device such as a random access memory (RAM), and stores therein various programs executed by the control unit 530. The storage unit 520 includes a site access log table 521.

The site access log table 521 stores therein information on a user ID, a site URL that a user accessed, and the access date and time which are associated with one another. Incidentally, the information stored in the site access log table 521 will be described later with reference to FIG. 8.

The control unit 530 is an electronic circuit, such as a central processing unit (CPU) or a micro processing unit (MPU), and executes various arithmetic processing. The control unit 530 includes an access-log generating unit 531 and an output control unit 532.

The access-log generating unit 531 acquires a site URL accepted from a user through the input unit 501, and stores the acquired site URL in the site access log table 521 in a manner associated with the access date and time. Furthermore, upon the acceptance of access from a user to the membership site, the access-log generating unit 531 transmits the generated site access log table 521 to the web server 600.

The output control unit 532 outputs a variety of information received from the web server 600 to the output unit 502. For example, the output control unit 532 causes the output unit 502 to display thereon the information received from the web server 600 as image information. Incidentally, the output control unit 532 can cause the output unit 502 to output the information received from the web server 600 as voice information.

Site Access Log Table 521

Figures 8, 9:
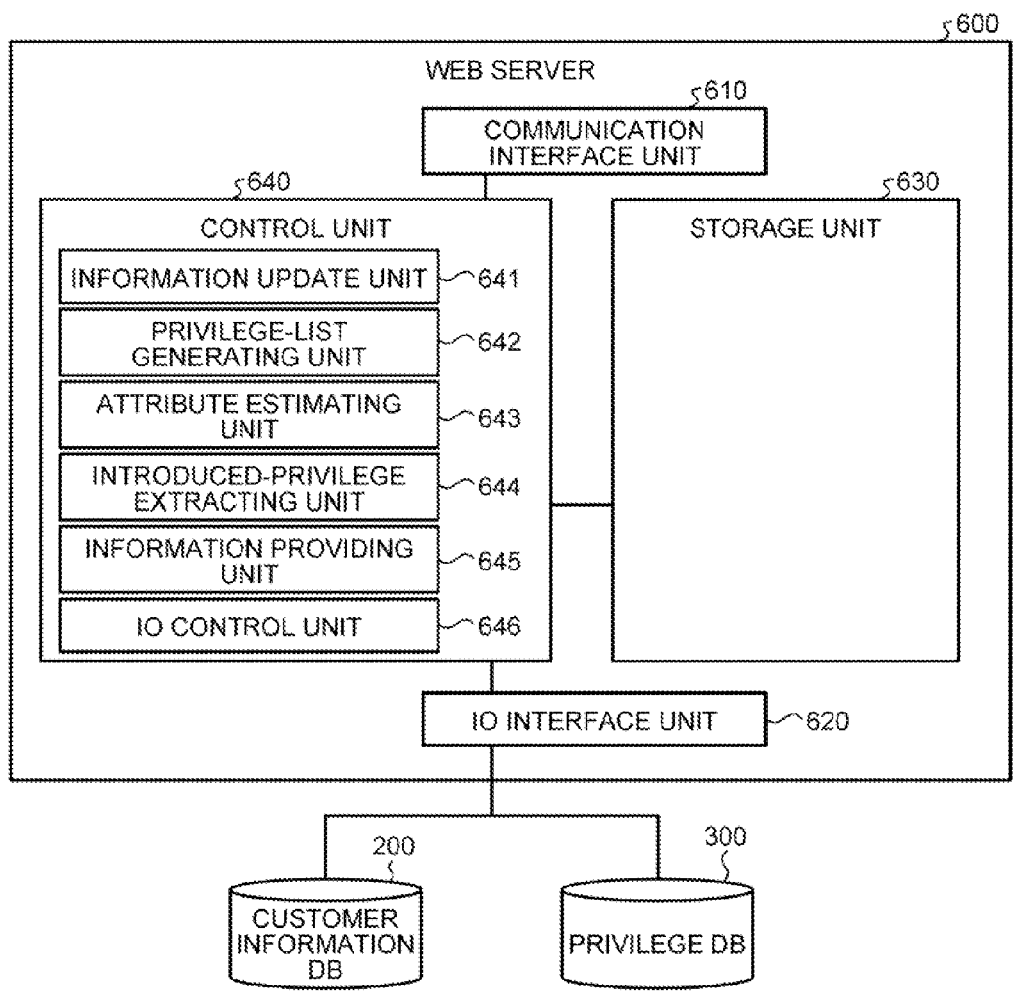
FIG. 8 is a diagram illustrating an example of information stored in a site access log table.
FIG. 9 is a block diagram illustrating a functional configuration of a web server according to the first embodiment.

The site access log table 521 stores therein a site URL that a user accessed and the access date and time in an associated manner. Information stored in the site access log table 521 is explained with reference to FIG. 8. FIG. 8 is a diagram illustrating an example of information stored in the site access log table 521.

As illustrated in FIG. 8, the site access log table 521 includes "member ID", "access date and time", and "site URL". The "member ID" included in the site access log table 521 is identical to the "member ID" included in the customer information DB 200.

The "access date and time" included in the site access log table 521 stores date and time when a user accessed a site. For example, "2012/01/25/21/33" indicating that the user accessed the site at 21:33 on Jan. 25, 2012 is stored in the "access date and time".

The "site URL" included in the site access log table 521 stores location information for identifying the site that the user accessed. For example, "http://aaaa.bbbb.ccc.co.jp/index.html" is stored in the "site URL".

As an example, the site access log table 521 illustrated in FIG. 8 indicates that a user "xxx1" accessed a site "http://aaaa.bbbb.ccc.co.jp/index.html" at 22:08 on Jan. 25, 2012.

Configuration of Web Server

Subsequently, a functional configuration of the web server 600 according to the first embodiment is explained with reference to FIG. 9. FIG. 9 is a block diagram illustrating the functional configuration of the web server 600 according to the first embodiment. As illustrated in FIG. 9, the web server 600 according to the first embodiment includes a communication interface unit 610, an input-output (IO) interface unit 620, a storage unit 630, and a control unit 640. The web server 600 is connected to the customer information DB 200 and the privilege DB 300.

The communication interface unit 610 is connected to the PC 500 via a network, and controls the exchange of information between the web server 600 and the PC 500. The IO interface unit 620 controls the exchange of information between the customer information DB 200 and the privilege DB 300.

The storage unit 630 is a semiconductor memory device, such as a random access memory (RAM), and stores therein various programs executed by the control unit 640. Furthermore, the storage unit 630 temporarily stores therein information read out from the customer information DB 200 and the privilege DB 300.

The control unit 640 is an electronic circuit such as a CPU or an MPU, and includes an information update unit 641, a privilege-list generating unit 642, an attribute estimating unit 643, an introduced-privilege extracting unit 644, an information providing unit 645, and an IO control unit 646.

The information update unit 641 stores a "member ID", "access date and time", and a "privilege ID" in the privilege access log table 302 in an associated manner when a user accessed a privilege.

Furthermore, the information update unit 641 stores a "member ID", a "privilege ID", and a "usage count" in the privilege usage count table 303 in an associated manner when a user used a privilege.

The privilege-list generating unit 642 makes a list of privileges to be provided to users. For example, the privilege-list generating unit 642 generates a list in which a privilege of which the number of accesses in a specified time period is larger than a predetermined reference value is associated with an attribute of a member who accessed the privilege more times than the predetermined reference value with reference to the privilege access log table 302. For example, the privilege-list generating unit 642 identifies a privilege ID of a privilege which has been accessed more than 100 times in the last three hours at 1-hour intervals. Incidentally, if there are many privilege IDs of privileges of which the number of accesses exceeds 100, the privilege-list generating unit 642 can identify privilege IDs of top ten privileges of the privileges. Furthermore, the predetermined reference value is not limited to 100.

Then, the privilege-list generating unit 642 identifies an attribute of a member who frequently accessed the privilege with the identified privilege ID, i.e., the privilege of which the number of accesses is larger than the predetermined reference value. For example, the privilege-list generating unit 642 identifies an attribute of a member who frequently accessed the privilege with the larger number of accesses using the member's sex and age as the attribute. Then, the privilege-list generating unit 642 generates a privilege list in which the identified "privilege ID" is associated with the "attribute". The privilege-list generating unit 642 outputs the generated privilege list to the introduced-privilege extracting unit 644.

The attribute estimating unit 643 estimates an attribute of a user when the web server 600 has accepted access to the membership site from the user via the PC 500. For example, using the site access log table 521 received from a PC, the attribute estimating unit 643 estimates an attribute of a user from a time of the access to the membership site or a site that the user accessed before the access to the membership site. Then, the attribute estimating unit 643 outputs the estimated attribute of the user to the introduced-privilege extracting unit 644.

The introduced-privilege extracting unit 644 extracts a privilege including an attribute estimated by the attribute estimating unit 643 from a privilege list generated by the privilege-list generating unit 642, and transmits the extracted privilege to the PC 500.

The information providing unit 645 accepts a privilege ID requested by a user from a transmitted list of privilege IDs, and transmits a site URL corresponding to the accepted privilege ID to the PC 500.

The IO control unit 646 retrieves information stored in the customer information DB 200 and the privilege DB 300 via the IO interface unit 620 and stores the retrieved information in the storage unit 630. Furthermore, the IO control unit 646 writes information stored in the storage unit 630 onto the customer information DB 200 and the privilege DB 300 via the IO interface unit 620.

Privilege List Generated by Privilege-list Generating Unit 642

Subsequently, a privilege list generated by the privilege-list generating unit 642 is explained with reference to FIG. 10. FIG. 10 is a diagram illustrating an example of a privilege list generated by the privilege-list generating unit 642. The privilege-list generating unit 642 generates a privilege list in which a "list ID" is associated with a "privilege ID" and an "attribute" as illustrated in FIG. 10. The "list ID" here indicates, for example, the ranking in the privilege list; the smaller the numerical value of list ID is, the larger the number of accesses to a privilege corresponding to the list ID is. The "privilege ID" indicates a privilege identified as a privilege of which the number of accesses in a specified time period is larger than a predetermined reference value. The "attribute" indicates an attribute of a member who frequently accessed the privilege.

For example, in the example illustrated in FIG. 10, the privilege-list generating unit 642 generates a privilege list indicating that a privilege identified by "00001" has the largest number of accesses, and many males in their teens and many females in their twenties accessed this privilege. Furthermore, the privilege-list generating unit 642 generates a privilege list indicating that a privilege identified by "00134" has the second largest number of accesses, and many males in their teens accessed this privilege.

Introduced-privilege Extracting Process

Figure 11A:
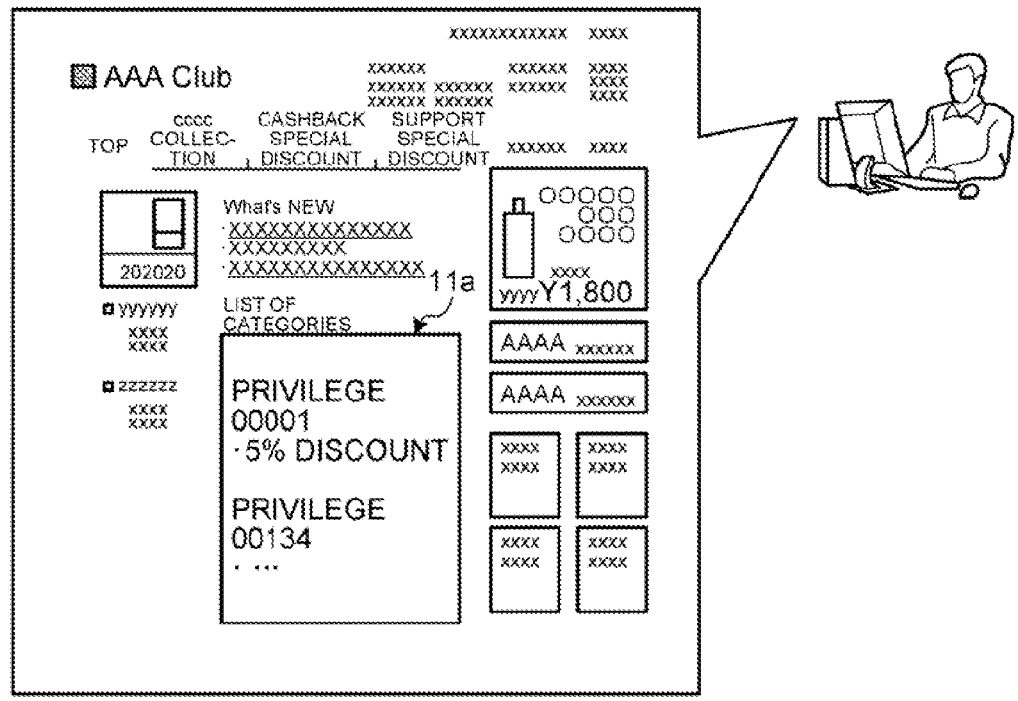
FIG. 11A is a diagram illustrating an example of a privilege that an introduced-privilege extracting unit extracts from the privilege list.
Figure 11B:
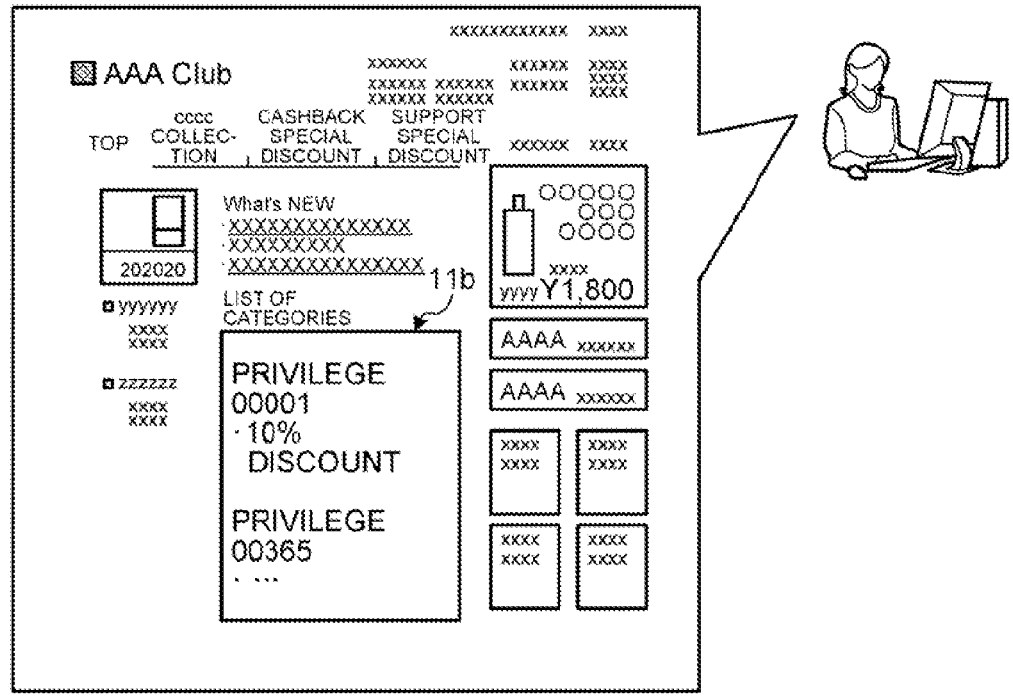
FIG. 11B is a diagram illustrating another example of a privilege that the introduced-privilege extracting unit extracts from the privilege list.

Subsequently, a privilege that the introduced-privilege extracting unit 644 extracts from the privilege list is explained with reference to FIGS. 11A and 11B. FIG. 11A is a diagram illustrating an example of a privilege that the introduced-privilege extracting unit 644 extracts from the privilege list;

FIG. 11B is a diagram illustrating another example of a privilege that the introduced-privilege extracting unit 644 extracts from the privilege list.

Incidentally, FIG. 11A illustrates a privilege introduced to a teenage male user who has used the privilege once in the past; FIG. 11B illustrates a privilege introduced to a twenty-something female user who has used the privilege seven times in the past. The introduced-privilege extracting unit 644 extracts a privilege identified by "00001" and a privilege identified by "00134" as privileges including "male in 10's", which is an attribute of the user, from the privilege list illustrated in FIG. 10. Then, the introduced-privilege extracting unit 644 reads out privilege contents of the extracted privileges from the introduced-privilege content table 304 and transmits the privilege contents to the PC 500. As a result, for example, as illustrated in 11a of FIG. 11A, the output unit 502 of the PC 500 is introduced to information that the privilege "00001" is a 5% discount and content of the privilege "00134".

Furthermore, the introduced-privilege extracting unit 644 extracts a privilege identified by "00001" and a privilege identified by "00365" as privileges including "female in 20's", which is an attribute of the user, from the privilege list illustrated in FIG. 10. Then, the introduced-privilege extracting unit 644 reads out privilege contents of the extracted privileges from the introduced-privilege content table 304 and transmits the privilege contents to the PC 500. As a result, for example, as illustrated in 11b of FIG. 11B, the output unit 502 of the PC 500 is introduced to information that the privilege "00001" is a 10% discount and content of the privilege "00365".

Processing Procedure of Processing by Information Providing System According to First Embodiment Subsequently, a processing procedure of processing by the information providing system 100 according to the first embodiment is explained with reference to FIG. 12. Here, an introduced-privilege extracting process performed by the web server 600 is explained with reference to FIG. 12.

Figure 12:
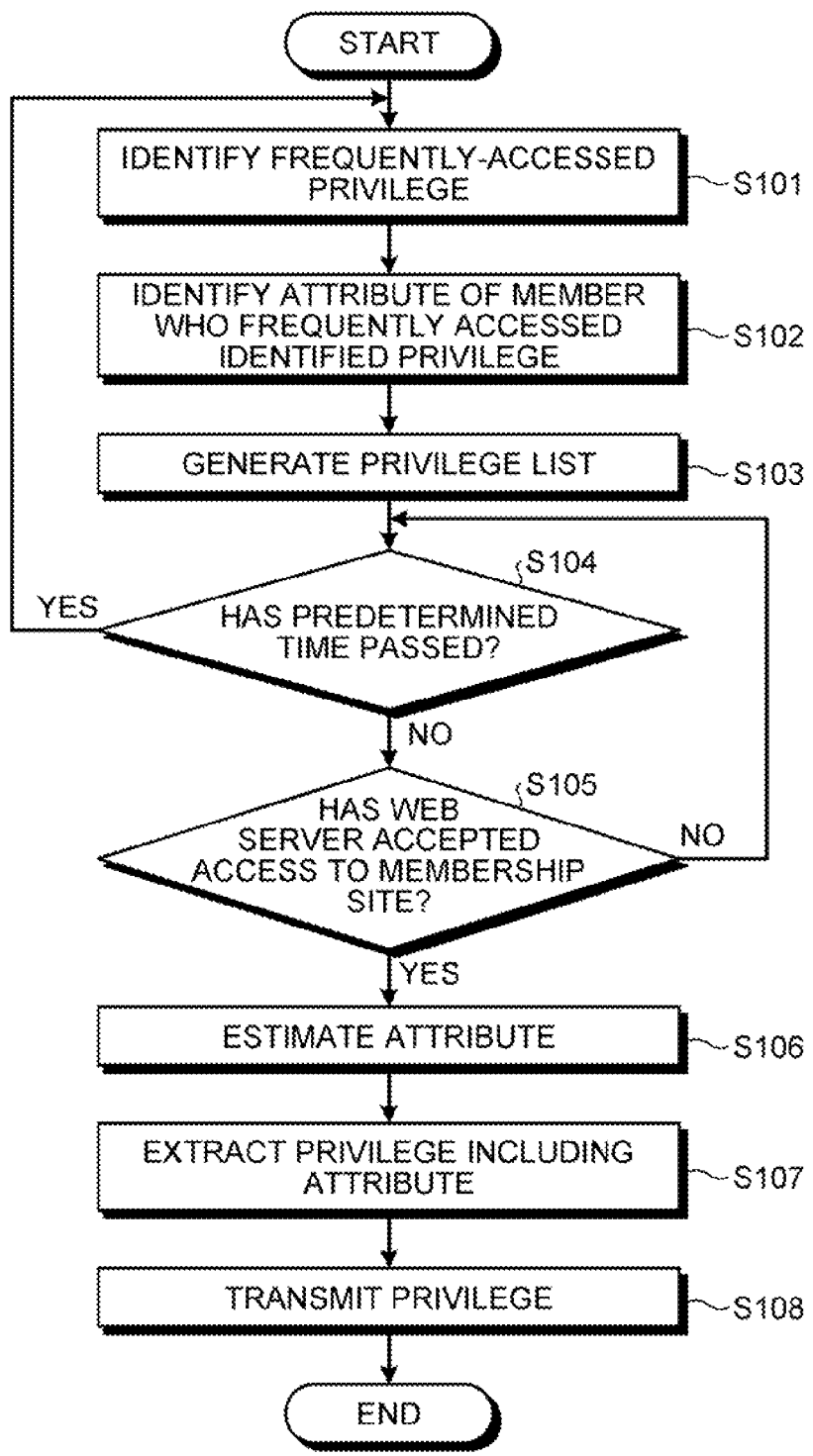
FIG. 12 is a flowchart illustrating a processing procedure of an introduced-privilege extracting process performed by the web server.

FIG. 12 is a flowchart illustrating a processing procedure of the introduced-privilege extracting process performed by the web server 600. As illustrated in FIG. 12, the privilege-list generating unit 642 identifies a privilege ID of a privilege frequently accessed in a specified time period from the privilege access log table 302 (Step S101). For example, the privilege-list generating unit 642 identifies privilege IDs of top ten privileges of which the number of accesses in the last three hours is larger than a predetermined reference value at 1-hour intervals.

Then, the privilege-list generating unit 642 identifies an attribute of a member who frequently accessed the privilege with the identified privilege ID, i.e., the privilege of which the number of accesses is larger than the predetermined reference value (Step S102). For example, the privilege-list generating unit 642 identifies an attribute of a member who frequently accessed the privilege with the larger number of accesses using the member's sex and age as the attribute. Then, the privilege-list generating unit 642 generates a privilege list in which the identified "privilege ID" is associated with the "attribute" (Step S103).

Then, the privilege-list generating unit 642 determines whether a predetermined time has passed (Step S104). For example, when the privilege-list generating unit 642 generates a privilege list at 1-hour intervals, the privilege-list generating unit 642 determines whether one hour has passed since the privilege-list generating unit 642 generated the last privilege list. When the privilege-list generating unit 642 has determined that the predetermined time has passed (YES at Step S104), the privilege-list generating unit 642 goes to Step S101 and performs a process of generating a new privilege list.

On the other hand, when the privilege-list generating unit 642 has determined that the predetermined time has not passed (NO at Step S104), the attribute estimating unit 643 determines whether the web server 600 has accepted access to the membership site from a user (Step S105). When the attribute estimating unit 643 has determined that the web server 600 has not accepted access to the membership site from the user (NO at Step S105), the privilege-list generating unit 642 determines whether the predetermined time has passed (Step S104).

On the other hand, when the attribute estimating unit 643 has determined that the web server 600 has accepted access to the membership site from the user (YES at Step S105), the attribute estimating unit 643 estimates an attribute of the user (Step S106). For example, the attribute estimating unit 643 estimates an attribute of the user from the access date and time or a site URL accessed.

Then, the introduced-privilege extracting unit 644 extracts a privilege including the attribute estimated by the attribute estimating unit 643 from the privilege list generated by the privilege-list generating unit 642 (Step S107). Then, the introduced-privilege extracting unit 644 transmits the extracted privilege to the PC 500 (Step S108).

Effect

When the web server 600 according to the first embodiment has accepted access to the membership site from a user, the web server 600 estimates an attribute of the user from a time of the access to the membership site, and extracts a privilege frequently accessed by members corresponding to the estimated attribute and notifies the user of the extracted privilege. Consequently, the web server 600 can improve accuracy of the recommend.

[b] Second Embodiment

In the first embodiment, there is described the example where the PC 500 transmits a site access log to the web server 600, and the web server 600 estimates an attribute of a user. Incidentally, there is sometimes a case where a user refuses the transmission of a site access log to the web server 600. In such a case, the PC 500 can estimate an attribute of a current user and provide the user a privilege including the estimated attribute in a privilege list received from the web server 600.

Configuration of Information Providing System According to Second Embodiment

Figure 13:
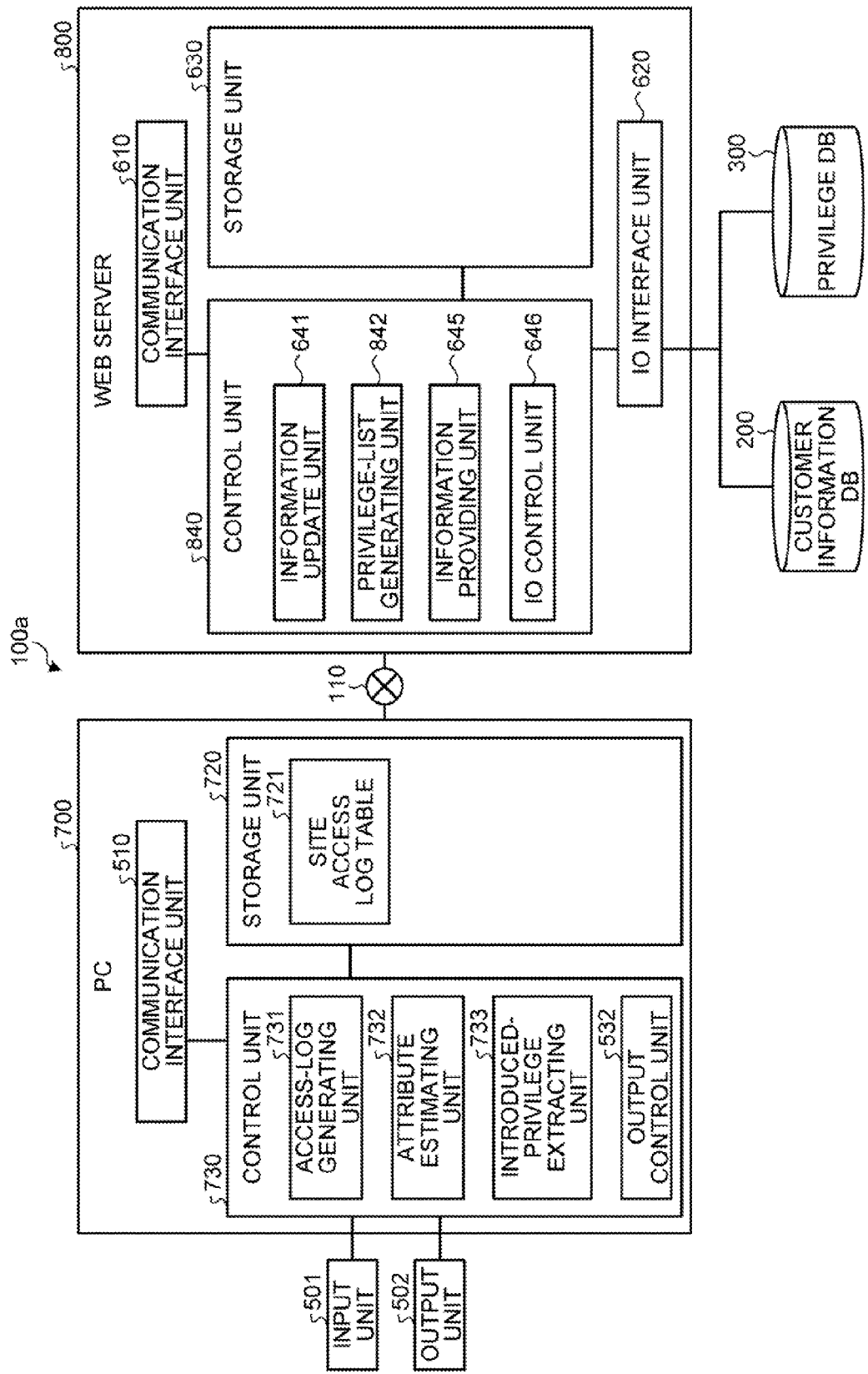
FIG. 13 is a block diagram illustrating a configuration of an information providing system according to a second embodiment.

A configuration of an information providing system 100a according to the second embodiment is explained with reference to FIG. 13. FIG. 13 is a block diagram illustrating the configuration of the information providing system 100a according to the second embodiment. As illustrated in FIG. 13, the information providing system 100a includes the customer information DB 200, the privilege DB 300, a PC 700, and a web server 800. Incidentally, a unit having the same configuration as that is illustrated in FIG. 1 is denoted by the same reference numeral, and detailed description of the unit is omitted.

Configuration of PC

The PC 700 according to the second embodiment includes the input unit 501, the output unit 502, the communication interface unit 510, a storage unit 720, and a control unit 730. Incidentally, a unit having the same configuration as that is illustrated in FIG. 7 is denoted by the same reference numeral, and detailed description of the unit is omitted.

The storage unit 720 is a semiconductor memory device such as a RAM, and stores therein various programs executed by the control unit 730. The storage unit 720 includes a site access log table 721.

The site access log table 721 stores therein information on a user ID, a user attribute, a site URL that a user accessed, and the access date and time which are associated with one another. Incidentally, the information stored in the site access log table 721 will be described later with reference to FIG. 14.

The control unit 730 is an electronic circuit, such as a CPU or an MPU, and executes various arithmetic processing. The control unit 730 includes an access-log generating unit 731, an attribute estimating unit 732, an introduced-privilege extracting unit 733, and the output control unit 532. Incidentally, a unit having the same configuration as that is illustrated in FIG. 1 is denoted by the same reference numeral, and detailed description of the unit is omitted.

The access-log generating unit 731 has the following function in addition to the function that the access-log generating unit 531 according to the first embodiment has. For example, the access-log generating unit 731 causes the attribute estimating unit 732 to classify a user when it is determined that a site URL corresponding to a site URL to which the access has been accepted has been stored in the site access log table 721.

When the PC 700 has accepted access to the membership site from a user, the attribute estimating unit 732 estimates an attribute of the user from a time of the access to the membership site or a site that the user accessed before the access to the membership site. For example, when the attribute estimating unit 732 is instructed to classify a user by the access-log generating unit 731, the attribute estimating unit 732 estimates an attribute of the user and stores the estimated attribute in "attribute" of the site access log table 721.

The introduced-privilege extracting unit 733 extracts a privilege including an attribute estimated by the attribute estimating unit 732 from a privilege list received from the web server 800, and outputs the extracted privilege to the output control unit 532.

Site Access Log Table 721 According to Second Embodiment

Information stored in the site access log table 721 according to the second embodiment is explained with reference to FIG. 14. FIG. 14 is a diagram illustrating an example of information stored in the site access log table 721 according to the second embodiment.

As illustrated in FIG. 14, the site access log table 721 includes "member ID", "attribute", "access date and time", and "site URL". The "member ID", the "access date and time", and the "site URL" included in the site access log table 721 are identical to those included in the site access log table 521.

The "attribute" included in the site access log table 721 stores an attribute of a user. For example, "male in 10's" indicating that a user is a teenage male or "female in 20's" indicating that a user is a twenty-something female is stored in the "attribute".

As an example, the site access log table 721 illustrated in FIG. 14 indicates that an attribute of a user "xxx1" who accessed a site "http://xxx.yyy.zzz.co.jp" at 21:33 on Jan. 25, 2012 is estimated to be a teenage male.

Configuration of Web Server

The web server 800 according to the second embodiment includes the communication interface unit 610, the IO interface unit 620, the storage unit 630, and a control unit 840. The web server 800 is connected to the customer information DB 200 and the privilege DB 300. Incidentally, a unit having the same configuration as that is illustrated in FIG. 9 is denoted by the same reference numeral, and detailed description of the unit is omitted.

The control unit 840 is an electronic circuit such as a CPU or an MPU, and includes the information update unit 641, a privilege-list generating unit 842, the information providing unit 645, and the IO control unit 646. Incidentally, a unit having the same configuration as that is illustrated in FIG. 9 is denoted by the same reference numeral, and detailed description of the unit is omitted.

The privilege-list generating unit 842 makes a list of privileges to be provided to users as is the case with the privilege-list generating unit 642 according to the first embodiment. Then, when the web server 800 has accepted access to the membership site from a user via the PC 700, the privilege-list generating unit 842 transmits the generated privilege list to the PC 700.

Processing Procedure of Processing by Information Providing System According to Second Embodiment Subsequently, a processing procedure of processing by the information providing system 100a according to the second embodiment is explained with reference to FIGS. 15 and 16. Here, an access-log generating process performed by the PC 700 is explained with reference to FIG. 15. Furthermore, an introduced-privilege extracting process performed by the PC 700 in a case where user's personal information has not been registered is explained with reference to FIG. 16.

Access-log Generating Process

FIG. 15 is a flowchart illustrating a processing procedure of the access-log generating process performed by the PC 700. As illustrated in FIG. 15, when the PC 700 has accepted access to a site, the access-log generating unit 731 of the PC 700 reads the site access log table 721 (Step S201). Then, the access-log generating unit 731 determines whether a site URL corresponding to a site URL to which the access has been accepted has been stored in the site access log table 721 (Step S202).

When the access-log generating unit 731 has determined that a site URL corresponding to a site URL to which the access has been accepted has not been stored in the site access log table 721 (NO at Step S202), the access-log generating unit 731 goes to Step S205.

When the access-log generating unit 731 has determined that a site URL corresponding to a site URL to which the access has been accepted has been stored in the site access log table 721 (YES at Step S202), the attribute estimating unit 732 classifies the user (Step S203). Then, the attribute estimating unit 732 stores user information in the site access log table 721 (Step S204). After Step S204, the access-log generating unit 731 goes to Step S205.

The access-log generating unit 731 stores the accepted site URL and the access data and time in the site access log table 721 in an associated manner (Step S205).

Figure 16:
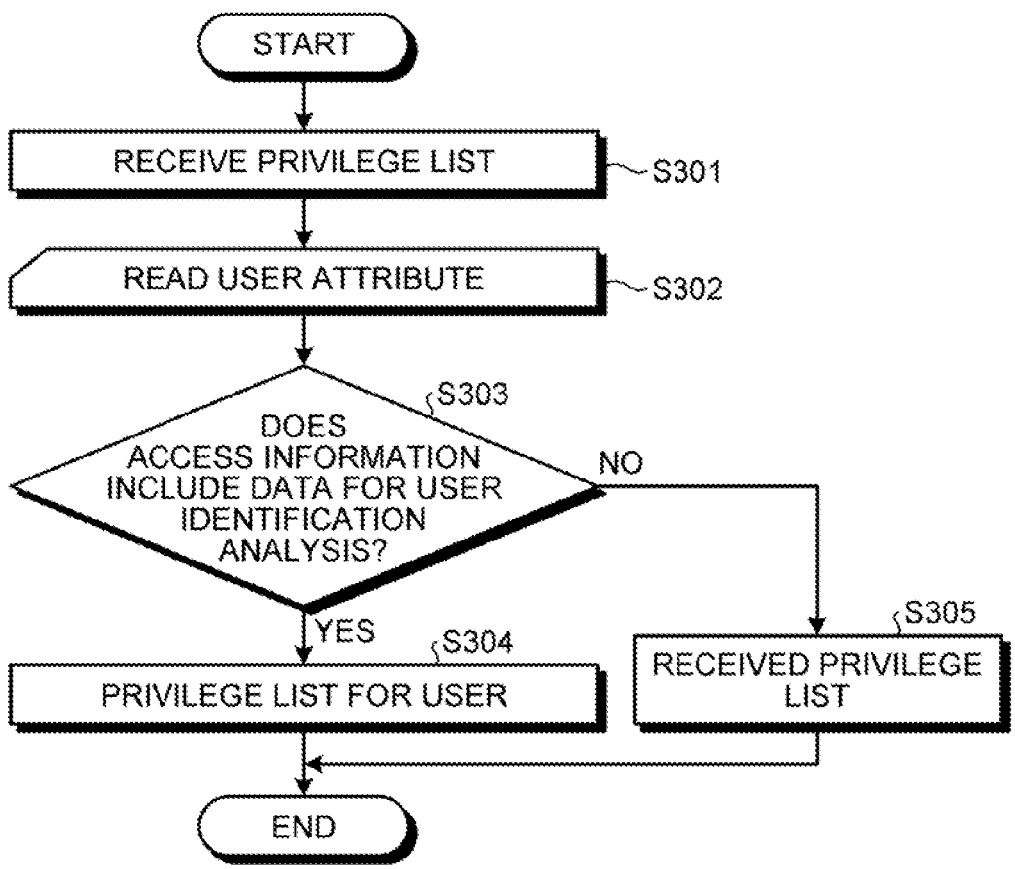
FIG. 16 is a flowchart illustrating a processing procedure of an introduced-privilege extracting process performed by the PC in a case where user's personal information has not been registered.

Introduced-privilege Extracting Process in Case Where Personal Information has not been Registered FIG. 16 is a flowchart illustrating a processing procedure of the introduced-privilege extracting process performed by the PC 700 in a case where user's personal information has not been registered. As illustrated in FIG. 16, the introduced-privilege extracting unit 733 of the PC 700 receives a privilege list from the web server 800 (Step S301), and reads the site access log table 721 (Step S302).

Here, the introduced-privilege extracting unit 733 determines whether an estimated attribute has been stored in the site access log table 721 (Step S303). When the introduced-privilege extracting unit 733 has determined that an estimated attribute has been stored in the site access log table 721 (YES at Step S303), the introduced-privilege extracting unit 733 extracts a privilege including the estimated attribute from the received privilege list and outputs the extracted privilege to the output control unit 532 (Step S304).

On the other hand, when the introduced-privilege extracting unit 733 has determined that an estimated attribute has not been stored in the site access log table 721 (NO at Step S303), the introduced-privilege extracting unit 733 outputs the received privilege list to the output control unit 532 (Step S305).

Effects

In the information providing system 100a according to the second embodiment, when the PC 700 has accepted access to the membership site from a user, the PC 700 estimates an attribute of the user from a time of the access to the membership site, and extracts a privilege frequently accessed by members corresponding to the estimated attribute, and then notifies the user of the extracted privilege. Consequently, even if a site access log is not provided to the web server 800 from a user, the information providing system 100a can improve accuracy of the recommend.

Furthermore, the information providing system 100a improves accuracy of the recommend as described above, and as a result, the number of times a user accesses a site can be increased. Moreover, the information providing system 100a is configured to give a user who has registered his/her personal information a more favorable privilege than a privilege given to a user who has not registered his/her personal information; therefore, it is possible to encourage a user to register his/her personal information in the membership site.

[c] Third Embodiment

Besides the above-described embodiments, the server device according to the present invention can be embodied in various different forms. In a third embodiment, there are described other embodiments of the server device according to the present invention.

System Configuration, Etc.

Out of the processes described in the present embodiments, all or part of the process described as an automatically-performed one can be manually performed. Furthermore, all or part of the process described as a manually-performed one can be automatically performed by a publicly-known method. In addition, the processing procedures, control procedures, and specific names illustrated in the above description and the drawings can be arbitrarily changed unless otherwise specified.

Furthermore, components illustrated in the drawings are functionally conceptual ones, and do not always have to be physically configured as illustrated in the drawings. For example, in the web server 600, the attribute estimating unit 643 and the introduced-privilege extracting unit 644 can be integrated into one unit. Moreover, all or any part of processing functions implemented in each device can be realized by a CPU and a program analyzed and executed by the CPU, or can be realized as hardware by wired logic.

Introduced-privilege Extracting Process in Case Where Personal Information Has Been Registered In a case where user's personal information has been registered, the privilege-list generating unit 842 can generate a privilege list using the user's personal information. Furthermore, in this case, the introduced-privilege extracting unit 733 can select whether or not to extract a privilege using an attribute estimated by the attribute estimating unit 732.

Figure 17:
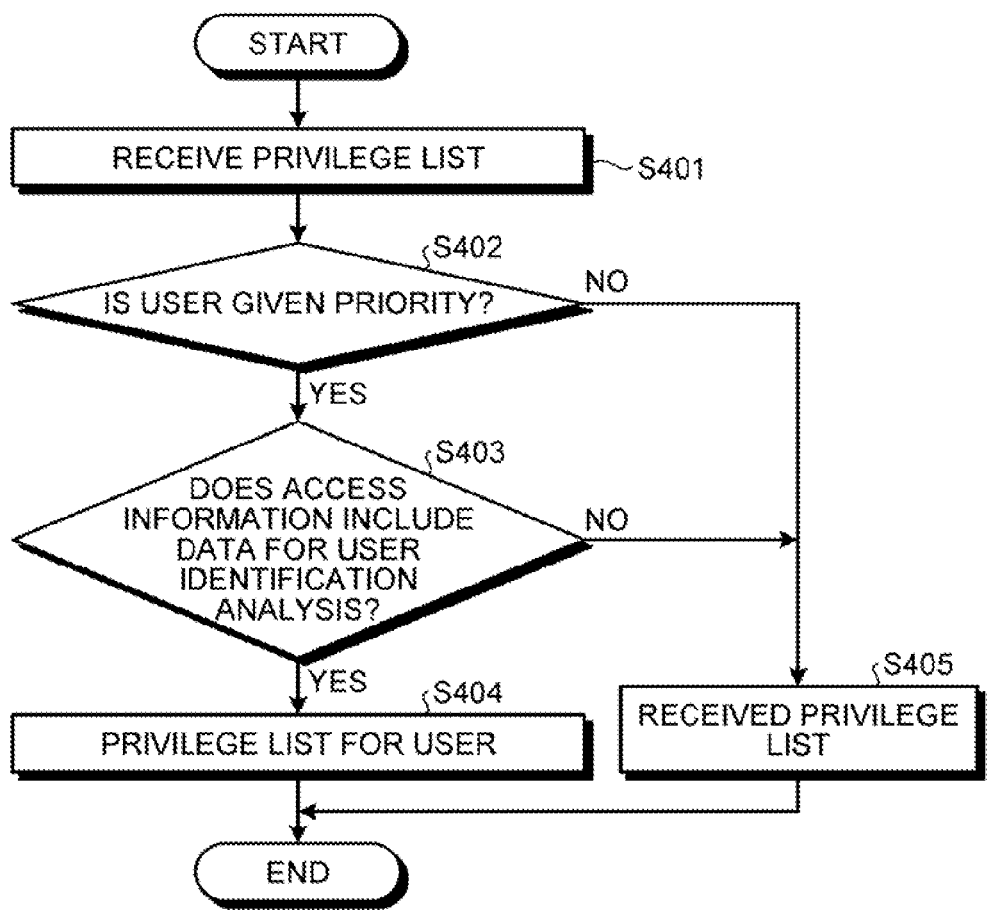
FIG. 17 is a flowchart illustrating a processing procedure of an introduced-privilege extracting process performed by the PC in a case where user's personal information has been registered.

An introduced-privilege extracting process performed by the PC 700 in a case where user's personal information has been registered is explained with reference to FIG. 17. FIG. 17 is a flowchart illustrating a processing procedure of the introduced-privilege extracting process performed by the PC 700 in the case where user's personal information has been registered.

As illustrated in FIG. 17, the introduced-privilege extracting unit 733 of the PC 700 receives a privilege list from the web server 800 (Step S401), and determines whether to give priority to a user (Step S402). When the introduced-privilege extracting unit 733 has determined not to give priority to the user (NO at Step S402), the introduced-privilege extracting unit 733 outputs the received privilege list to the output control unit 532 (Step S405).

On the other hand, when the introduced-privilege extracting unit 733 has determined to give priority to the user (YES at Step S402), the introduced-privilege extracting unit 733 determines whether an estimated attribute has been stored in the site access log table 721 (Step S403). When the introduced-privilege extracting unit 733 has determined that an estimated attribute has been stored in the site access log table 721 (YES at Step S403), the introduced-privilege extracting unit 733 extracts a privilege including the estimated attribute from the received privilege list and outputs the extracted privilege to the output control unit 532 (Step S404).

On the other hand, when the introduced-privilege extracting unit 733 has determined that an estimated attribute has not been stored in the site access log table 721 (NO at Step S403), the introduced-privilege extracting unit 733 outputs the received privilege list to the output control unit 532 (Step S405).

Program

Incidentally, the various processes described in the above embodiments can be realized by causing a computer system, such as a personal computer or a workstation, to execute a program prepared in advance. An example of a computer that executes a program having the same functions as those described in the above embodiments is explained below.

Figure 18:
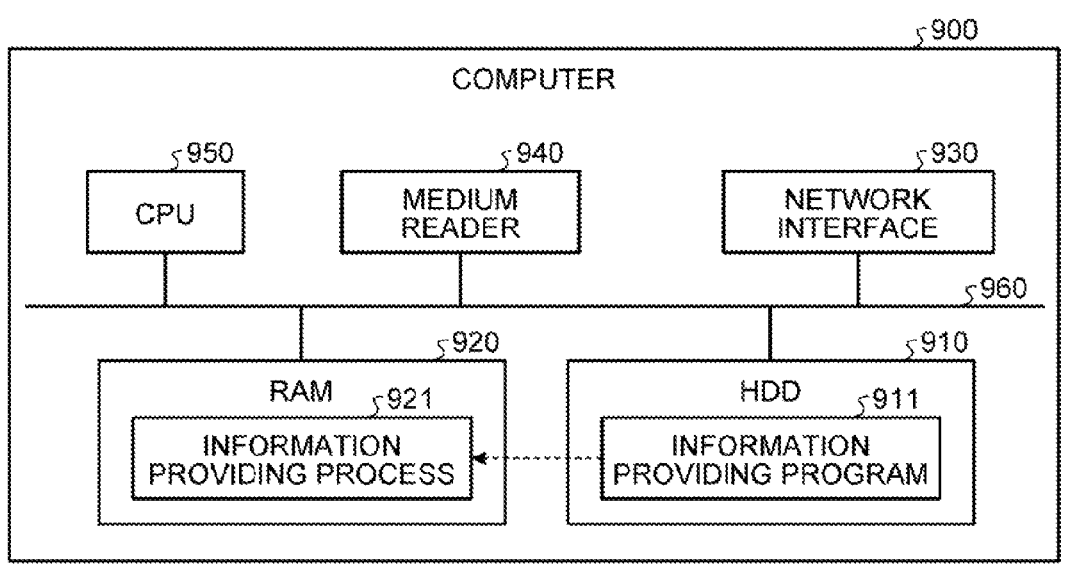
FIG. 18 is a diagram illustrating an example of a computer that executes an information providing program.

FIG. 18 is a diagram illustrating an example of a computer 900 that executes an information providing program. As illustrated in FIG. 18, the computer 900 includes a hard disk drive (HDD) 910, a RAM 920, a network interface 930 for transmitting and receiving data with another device, a medium reader 940, and a CPU 950. The devices 910 to 950 are connected to a bus 960.

As illustrated in FIG. 18, an information providing program 911, which fulfills the same functions as the privilege-list generating unit 642, the attribute estimating unit 643, and the introduced-privilege extracting unit 644 illustrated in FIG. 9, has been stored in the HDD 910 in advance. The medium reader 940 stores therein various data for implementing the information providing program 911. The CPU 950 reads out the information providing program 911 from the HDD 910, and executes the information providing program 911 as an information providing process 921. Namely, the information providing process 921 executes the same operations as the privilege-list generating unit 642, the attribute estimating unit 643, and the introduced-privilege extracting unit 644 illustrated in FIG. 9.

Incidentally, the above-described information providing program 911 does not always have to be stored in the HDD 910. For example, the information providing program 911 can be stored in a "portable physical medium" to be inserted into the computer 900, such as a flexible disk (FD), a CD-ROM, an MO disk, a DVD, a magnet-optical disk, or an IC card. Furthermore, the information providing program 911 can be stored in a "fixed physical medium" installed inside or outside the computer 900, such as an HDD. Moreover, the information providing program 911 can be stored on "another computer system" connected to the computer 900 via a public line, the Internet, a local area network (LAN), or a wide area network (WAN), etc. Then, the computer 900 can retrieve the program from any of these and execute the program.

Namely, this program is stored in a recording medium, such as the above-described "portable physical medium", "fixed physical medium", or "communication medium", in a computer-readable form. Then, the computer 900 retrieves the program from the recording medium and executes the program, thereby realizing the same functions as those described in the above embodiments. Incidentally, the program in this embodiment is not limited to be executed by the computer 900. For example, the present invention can be also applied to a case where another computer or a server executes the program and a case where these execute the program in cooperation with each other.

According to one aspect of a server device, an information providing program, an information providing method, and an information providing system discussed in the present application, it is possible to improve accuracy of the recommend.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A web server comprising:
a memory that stores therein an identifier of an electronic coupon which is provided to a member of a membership site when accessing a shopping mall site through the membership site, a name of the shopping mall site, a URL of the shopping mall site, a content of the electronic coupon, date and time when the member of the membership site accesses the shopping mall site to use the electronic coupon, and a registered attribute of the member in an associated manner, and further stores a different electronic coupon in association with a number of times of usage of electronic coupons at the shopping mall site, and a number of times of usage of electronic coupons at the shopping mall site by the member in a past, the membership site being provided by the web server and the shopping mall site being provided by another server different from the web server; and
a processor coupled to the memory, wherein the processor executes a process comprising:
generating, referring to the memory, a list in which an electronic coupon for which the number of accesses to the shopping mall site where the electronic coupon is used in a specified time period is larger than a predetermined reference value is associated with an attribute of a member who accessed the shopping mall site to use the electronic coupon more times than a predetermined reference value;
estimating, when the web server has accepted access to the membership site from a user who is registered as a member of the membership site but whose attribute is not registered in the memory, an attribute of the user from at least one of a time of the access to the membership site and a site that the user accessed before the access to the membership site; and
extracting an electronic coupon associated with the attribute estimated at the estimating from the list generated by the generating, and notifying the user of the extracted electronic coupon and at least one of the name of the shopping mall site and the URL of the shopping mall site associated with the extracted electronic coupon in the memory, wherein the extracting extracts a different electronic coupon according to the number of times of usage of electronic coupons at the shopping mall site by the member in the past, the electronic coupon offering a higher discount to the member who used the electronic coupons more times in the past.

2. A non-transitory computer-readable recording medium having stored therein a program for causing a computer to execute an information providing process comprising:
generating a list in which an electronic coupon for which the number of accesses to a shopping mall site where the electronic coupon is used in a specified time period is larger than a predetermined reference value is associated with an attribute of a member of a membership site who accessed the shopping mall site to use the electronic coupon more times than a predetermined reference value by reference to a memory that stores therein an identifier of the electronic coupon which is provided to the member of the membership site when accessing the shopping mall site through the membership site, a name of the shopping mall site, a URL of the shopping mall site, a content of the electronic coupon, date and time when the member of the membership site accesses the shopping mall site to use the electronic coupon, and a registered attribute of the member in an associated manner, and further stores a different electronic coupon in association with a number of times of usage of electronic coupons at the shopping mall site, and a number of times of usage of electronic coupons at the shopping mall site by the member in a past, the membership site being provided by the web server and the shopping mall site being provided by another server different from the web server;
estimating, when having accepted access to the membership site from a user who is registered as a member of the membership site but whose attribute is not registered in the memory, an attribute of the user from at least one of a time of the access to the membership site and a site that the user accessed before the access to the membership site; and
extracting an electronic coupon associated with the estimated attribute from the generated list and notifying the user of the extracted electronic coupon and at least one of the name of the shopping mall site and the URL of the shopping mall site associated with the extracted electronic coupon in the memory, wherein the extracting extracts a different electronic coupon according to the number of times of usage of electronic coupons at the shopping mall site by the member in the past, the electronic coupon offering a higher discount to the member who used the electronic coupons more times in the past.

3. An information providing system comprising:
an information processing apparatus; and
a web server that is connected to the information processing apparatus via a network, wherein
the web server comprises:
a first memory that stores therein an identifier of an electronic coupon which is provided to a member of a membership site when accessing a shopping mall site through the membership site, a name of the shopping mall site, a URL of the shopping mall site, a content of the electronic coupon, date and time when the member of the membership site accesses the shopping mall site to use the electronic coupon, and a registered attribute of the member in an associated manner, and further stores a different electronic coupon in association with a number of times of usage of electronic coupons at the shopping mall site, and a number of times of usage of electronic coupons at the shopping mall site by the member in a past, the membership site being provided by the web server and the shopping mall site being provided by another server different from the web server; and a first processor coupled to the first memory, wherein the first processor executes a process comprising:

generating, referring to the memory, a list in which an electronic coupon for which the number of accesses to the shopping mall site where the electronic coupon is used in a specified time period is larger than a predetermined reference value is associated with an attribute of a member who accessed the shopping mall site to use the electronic coupon more times than a predetermined reference value; and transmitting the list generated by the generating to the information processing apparatus, and the information processing apparatus comprises:

a second memory; and a second processor coupled to the second memory, wherein the second processor executes a process comprising:

receiving the list from the web server;

estimating, when having accepted access to the membership site from a user who is registered as a member of the membership site but whose attribute is not registered in the memory, an attribute of the user from at least one of a time of the access to the membership site and a site that the user accessed before the access to the membership site; and extracting an electronic coupon associated with the attribute estimated at the estimating from the list generated at the generating, and notifying the user of the extracted electronic coupon and at least one of the name of the shopping mall site and the URL of the shopping mall site associated with the extracted electronic coupon in the first memory, wherein the extracting extracts a different electronic coupon according to the number of times of usage of electronic coupons at the shopping mall site by the member in the past, the electronic coupon offering a higher discount to the member who used the electronic coupons more times in the past.

4. The web server according to claim 1, wherein the generating updates the list when a predetermined time has passed, referring to information stored in the memory during the predetermined time.

\* \* \* \* \*